UNITED STATES PATENT OFFICE.

WILHELM HERZBERG AND MAX RONUS, OF BERLIN, GERMANY, ASSIGNORS TO ACTIEN GESELLSCHAFT FÜR ANILIN FABRIKATION, OF BERLIN, GERMANY.

AZO DYE AND PROCESS OF MAKING SAME.

955,068. Specification of Letters Patent. Patented Apr. 12, 1910.

No Drawing.   Application filed January 3, 1910.   Serial No. 536,155.

*To all whom it may concern:*

Be it known that we, WILHELM HERZBERG and MAX RONUS, citizens of (the former) the German Empire and (the latter) the Swiss Republic, residing at Berlin, Germany, our post-office addresses being (the former) Berlin W. 30, Landshuterstrasse 24, and (the latter) Berlin W. 35, Schöneberger Ufer 36ª, have invented certain new and useful Improvements in New Azo Coloring-Matters and Processes of Making Same, of which the following is a specification.

We have found that by combining the diazo compound of an aromatic amin of the general formula:

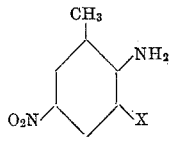

in which formula X represents a halogen atom, with beta-naphthol, new monoazo dyestuffs are obtained which possess, generally speaking, a very brilliant red tint and are especially adapted for the manufacture of pigment-colors or lakes. The new colors or lakes are obtained from the new dyestuffs in the manner usual for production of lakes and possess, in addition to a brilliant tint, a very great fastness to light; furthermore, they are totally insoluble in water, in alcohol and in oil. The manufacture of lakes may also be combined with the production of the dyestuffs for instance by mixing the solution of the beta-naphthol with a suitable lake substratum, such as for instance aluminium hydrate, and adding the respective diazo-solution to the mixture.

The following example illustrates our invention, the parts being by weight: 18.6 parts of 3-chloro-5-nitro-2-amino-1-methylbenzene are brought to a fine suspension with water in mixture with 27 parts of hydrochloric acid of 20° Bé. specific gravity, whereupon an aqueous solution of 7 parts of sodium nitrite is added while stirring well. When the nitrite is totally absorbed the solution is filtered if necessary in order to remove the substances not dissolved and the solution is allowed to run into a fine suspension of 14.4 parts of beta-naphthol with water. The formation of the dyestuff occurs at once and is complete after a short time. The mass is then drained and thoroughly washed with water. In order to use the dyestuff for industrial purposes it may be directly used in the form of a paste as obtained above; or this paste may be dried and finely pulverized.

The new dyestuff as above obtained forms in the dry state an intense and brilliant red powder which is insoluble in water, in alcohol at ordinary temperature and in boiled linseed-oil (linseed-oil varnish). Alcohol on boiling dissolves the dyestuff in very small proportion the solution assuming a yellow color. By adding concentrated soda-lye to the pulverized dyestuff the powder assumes a brown color which on boiling turns to black the solution assuming a yellow coloration. Dilute soda-lye does not alter the tint of the powder, whereas on boiling it becomes a little browner. In concentrated sulfuric acid the dyestuff dissolves to a blue-red solution which on the addition of ice separates red-orange flakes.

It is obvious to those skilled in the art that our invention is not limited to the foregoing example or to the details given therein. Of course instead of the chloro compound used in the above example the corresponding bromo derivative may be employed. Furthermore it may be stated that the production of the dyestuff may be combined with the manufacture of a color lake, for instance by adding a suitable lake substratum to the finely divided beta-naphthol into which mixture is then introduced the diazo solution prepared from the respective halogen derivative of para-nitro-ortho-toluidin.

Having now described our invention and the manner in which it may be performed, what we claim is,—

1. The hereinbefore-described new monoazo-dyestuffs having the general composition: 3-halogen-5-nitro-2-amino-1-methylbenzene-azo-beta-naphthol, which new dyestuffs may be obtained by combining the diazo-compound of a 3-halogen-5-nitro-2-amino-1-methylbenzene with beta-naphthol, these new dyestuffs being in the dry and pulverized shape intense and brilliant red powders, which are insoluble in water and in boiled linseed-oil (linseed-oil varnish) and are very sparingly soluble in alcohol, whereas they dissolve in concentrated sulfuric acid to a blue-red solution from which solution by the addition of ice red-orange flakes are separated, these new azo-dyestuffs being especially adapted for the manufacture of color lakes and being split up by the action of strong reducing agents, thus yielding a halogen derivative of para-toluylenediamin besides ortho-aminonaphthol.

2. The hereinbefore-described new azo-dyestuff, having the formula:

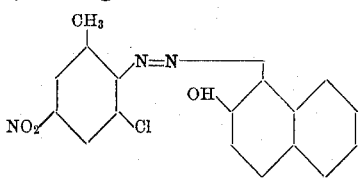

which may be obtained by diazotizing 3-chloro-5-nitro-2-amino-1-methylbenzene and combining the diazo-compound thus obtained with beta-naphthol, this new dyestuff being in the dry and pulverized shape an intense and brilliant red powder which is insoluble in water and in boiled linseed-oil (linseed-oil varnish) and is very sparingly soluble in alcohol to a yellow-colored solution, and which powder by adding concentrated soda-lye assumes a brown color which on boiling turns to black, the solution assuming a yellow coloration, whereas dilute soda-lye does not alter the tint of the powder, but the powder on boiling becoming a little browner, this dyestuff dissolving in concentrated sulfuric acid to a blue-red solution, which on the addition of ice separates red-orange flakes, and this new azo-dyestuff being especially adapted for the manufacture of color-lakes, which new azo-dyestuff by the action of a strong reducing agent (stannous chlorid in combination with hydrochloric acid) is split up, thus yielding meta-chloro-para-toluylenediamin besides ortho-aminonaphthol.

In testimony whereof we have hereunto set our hands in presence of two subscribing witnesses.

WILHELM HERZBERG.
MAX RONUS.

Witnesses:
HENRY HASPER,
WOLDEMAR HAUPT.